United States Patent
Liu et al.

(10) Patent No.: US 11,829,538 B2
(45) Date of Patent: Nov. 28, 2023

(54) DISPLAY DEVICE AND MANUFACTURING METHOD THEREOF

(71) Applicants: Chengdu BOE Optoelectronics Technology Co., Ltd., Sichuan (CN); BOE Technology Group Co., Ltd., Beijing (CN)

(72) Inventors: Xiaoxia Liu, Beijing (CN); Fei Li, Beijing (CN); Fuzheng Xie, Beijing (CN); Junhui Yang, Beijing (CN); Jiaxiang Zhang, Beijing (CN); Kang Wang, Beijing (CN); Haotian Yang, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 370 days.

(21) Appl. No.: 17/262,930

(22) PCT Filed: Jul. 23, 2020

(86) PCT No.: PCT/CN2020/103732
§ 371 (c)(1),
(2) Date: Jan. 25, 2021

(87) PCT Pub. No.: WO2021/042899
PCT Pub. Date: Mar. 11, 2021

(65) Prior Publication Data
US 2022/0334662 A1 Oct. 20, 2022

(30) Foreign Application Priority Data
Sep. 2, 2019 (CN) .......................... 201910823163.2

(51) Int. Cl.
*G06F 3/041* (2006.01)
*G06F 3/044* (2006.01)

(52) U.S. Cl.
CPC .... *G06F 3/041* (2013.01); *G06F 2203/04102* (2013.01); *G06F 2203/04103* (2013.01)

(58) Field of Classification Search
CPC .......... G06F 3/041; G06F 2203/04102; G06F 2203/04103; G06F 3/04164
See application file for complete search history.

(56) References Cited

U.S. PATENT DOCUMENTS

2014/0273345 A1 9/2014 Sriram et al.
2015/0177893 A1* 6/2015 Lee .................... G05B 19/4188
700/121

(Continued)

FOREIGN PATENT DOCUMENTS

CN 108958539 A 12/2018
CN 109164937 A 1/2019

(Continued)

OTHER PUBLICATIONS

International Search Report dated Oct. 28, 2020, issued in counterpart Application No. PCT/CN2020/103732, with English Translation. (7 pages).

(Continued)

*Primary Examiner* — Md Saiful A Siddiqui
(74) *Attorney, Agent, or Firm* — WHDA, LLP

(57) ABSTRACT

The present disclosure provides a display device and a manufacturing method thereof. In an embodiment, the display device includes a display panel, a touchpad and a joint. The touchpad is located on a display side of the display panel and includes a main body area and a bonding area. The joint is arranged on a side of the display panel facing the touchpad and is configured to electrically connect the touch- (Continued)

pad and a driving chip. A side of the bonding area facing the display panel is configured to be joined with the joint.

16 Claims, 5 Drawing Sheets

(56) References Cited

U.S. PATENT DOCUMENTS

| | | | | |
|---|---|---|---|---|
| 2019/0206898 A1* | 7/2019 | Baek | ................. | H01L 27/1218 |
| 2019/0278411 A1* | 9/2019 | Jeon | ................. | G06F 1/1643 |
| 2020/0210041 A1 | 7/2020 | Liu | | |
| 2020/0393936 A1* | 12/2020 | Bok | ................. | G06F 3/04166 |
| 2021/0343824 A1* | 11/2021 | Kim | ................. | H10K 50/86 |

FOREIGN PATENT DOCUMENTS

| | | |
|---|---|---|
| CN | 109445649 A | 3/2019 |
| CN | 209199507 U | 8/2019 |
| CN | 209312000 U | 8/2019 |
| CN | 110515501 A | 11/2019 |

OTHER PUBLICATIONS

Written Opinion dated Oct. 28, 2020, issued in counterpart Application No. PCT/CN2020/103732. (4 pages).

* cited by examiner

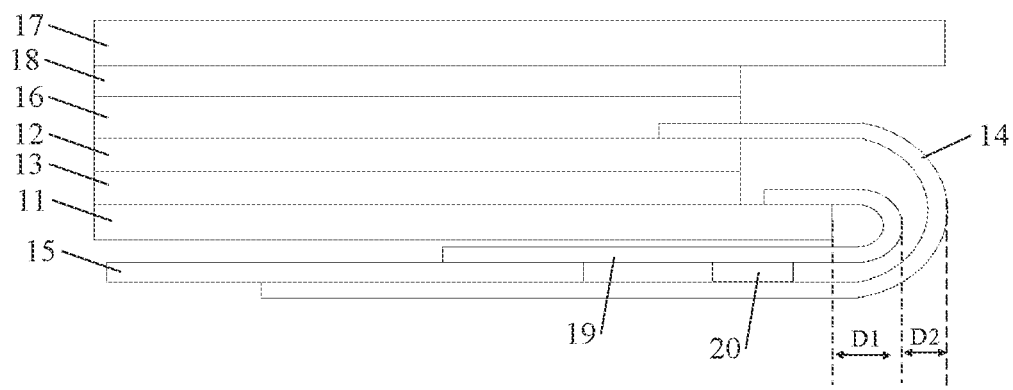
FIG.1 - Prior Art
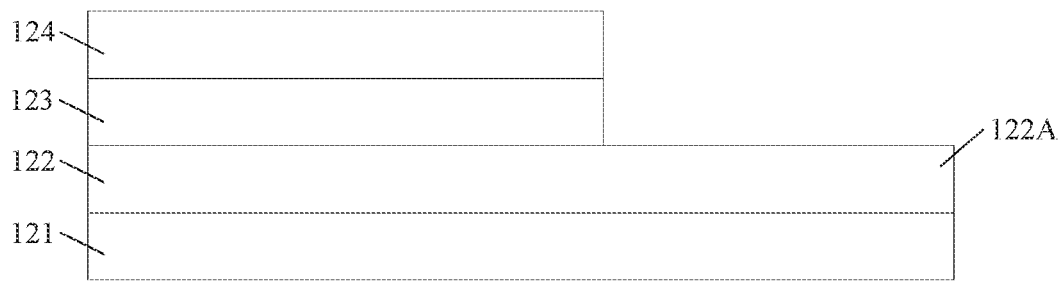
FIG.2 - Prior Art
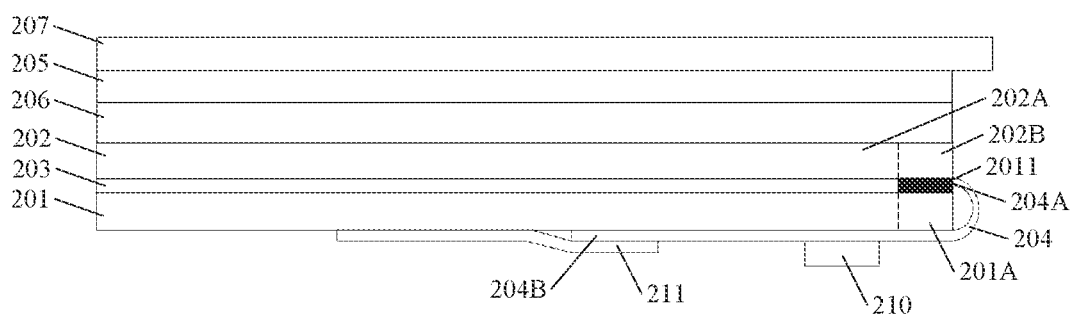
FIG.3

DISPLAY DEVICE AND MANUFACTURING METHOD THEREOF

CROSS-REFERENCE TO RELATED APPLICATION

This application claims priority to Chinese Patent Application No. 201910823163.2, filed on Sep. 2, 2019, which is incorporated herein by reference in its entirety.

TECHNICAL FIELD

Embodiments of the present disclosure relate to a display device and a manufacturing method thereof.

BACKGROUND

A touch display device includes a display panel and a touch structure arranged on a display side of the display panel. The touch structure may act as an information input device of the touch display device, which can achieve human-computer interaction simply and conveniently and provide people with a new multimedia human-computer interaction method. A driving chip for controlling the display panel and the touch structure is usually arranged on a non-display side of the display panel. The display panel and the touch structure are electrically connected to the driving chip respectively through a bonding structure and a circuit board, so as to obtain electrical signals from the driving chip or transmit electrical signals to the driving chip.

SUMMARY

According to one aspect, at least one embodiment of the present disclosure provides a display device, including: a display panel; a touchpad located on a display side of the display panel and including a main body area and a bonding area; and a joint arranged on a side of the display panel facing the touchpad and configured to electrically connect the touchpad and a driving chip, wherein a side of the bonding area facing the display panel is configured to be joined with the joint.

For example, in the display device provided in at least one embodiment of the present disclosure, the display panel includes a touchpad bonding area, and the joint is arranged in the touchpad bonding area; the touchpad includes a bonding structure located in the bonding area, and the joint is electrically connected to the bonding structure.

For example, in the display device provided in at least one embodiment of the present disclosure, the joint is arranged on the side of the display panel facing the touchpad, and the joint is directly opposite to and electrically connected to the bonding structure.

For example, the display device provided in at least one embodiment of the present disclosure further includes a chip on film, a first end of the chip on film is bonded to the joint located in the touchpad bonding area and a second end of the chip on film is arranged on a non-display side of the display panel, wherein the driving chip is arranged on a portion of the chip on film that is located on the non-display side.

For example, in the display device provided in at least one embodiment of the present disclosure, the display panel further includes a display bonding area, the touchpad bonding area and the display bonding area are located on the same side of the display panel and are insulated from each other, and the first end of the chip on film is further bonded to the display bonding area.

For example, in the display device provided in at least one embodiment of the present disclosure, the touchpad bonding area and the display bonding area are arranged side by side on the same side.

For example, in the display device provided in at least one embodiment of the present disclosure, the display panel includes two touchpad bonding areas respectively arranged on both sides of the display bonding area.

For example, in the display device provided in at least one embodiment of the present disclosure, the display panel includes a bending area and a non-display side portion, the touchpad bonding area is arranged on the side of the display panel facing the touchpad, the non-display side portion includes a portion of the display panel that is bent to the non-display side of the display panel, the driving chip is arranged on the non-display side portion, and the touchpad is electrically connected to the driving chip through the touchpad bonding area and the bending area.

For example, in the display device provided in at least one embodiment of the present disclosure, the main body area includes a substrate, a wiring layer and an insulating layer sequentially stacked from a display panel side, and the bonding area includes the bonding structure and the insulating layer sequentially stacked from the display panel side, wherein the bonding structure and the wiring layer are arranged in the same layer.

For example, in the display device provided in at least one embodiment of the present disclosure, the bonding area further includes a strengthening layer arranged on a side of the insulating layer away from the bonding structure, wherein the strengthening layer has a hardness greater than that of each of the substrate, the wiring layer, the bonding structure and the insulating layer.

For example, in the display device provided in at least one embodiment of the present disclosure, the strengthening layer has a Mohs hardness greater than or equal to 5, and a thickness of about 1 μm-5 μm.

For example, in the display device provided in at least one embodiment of the present disclosure, the strengthening layer is a silicide film formed by silicidation, and the silicide film includes silicon dioxide.

According to another aspect, at least one embodiment of the present disclosure provides a manufacturing method of a display device, including: providing a display panel; providing a touchpad including a main body area and a bonding area; providing a joint on a side of the display panel facing the touchpad, wherein the joint is configured to electrically connect the touchpad and a driving chip; and joining a side of the bonding area facing the display panel to the joint, so as to join the touchpad to a display side of the display panel.

For example, in the manufacturing method provided in at least one embodiment of the present disclosure, the display panel includes a touchpad bonding area, the joint is formed in the touchpad bonding area, the touchpad includes a bonding structure located in the bonding area; and the joining a side of the bonding area facing the display panel to the joint includes: joining and electrically connecting the bonding structure to the joint.

For example, the manufacturing method provided in at least one embodiment of the present disclosure further includes: providing a chip on film, bonding a first end of the chip on film to the joint located in the touchpad bonding area, and forming a second end of the chip on film on a non-display side of the display panel by bending, wherein the driving chip is arranged on a portion of the chip on film that is located on the non-display side.

For example, in the manufacturing method provided in at least one embodiment of the present disclosure, the display panel includes a bending area and a non-display side portion, and the manufacturing method further includes: bending the bending area so as to form the non-display side portion on the non-display side of the display panel, wherein the driving chip is arranged on the non-display side portion, and the touchpad is electrically connected to the driving chip through the touchpad bonding area and the bending area.

For example, in the manufacturing method provided in at least one embodiment of the present disclosure, subsequent to joining the side of the bonding area facing the display panel to the joint, the manufacturing method further includes: combining the main body area with the display panel.

For example, in the manufacturing method provided in at least one embodiment of the present disclosure, the providing a touchpad includes: forming, on a substrate, a wiring layer located in the main body area and a bonding structure located in the bonding area; forming an insulating layer on the wiring layer and the bonding structure; and removing a portion of the substrate located in the bonding area, so as to expose the bonding structure.

For example, in the manufacturing method provided in at least one embodiment of the present disclosure, the removing a portion of the substrate located in the bonding area so as to expose the bonding structure includes: removing, by using a laser lift-off method, the portion of the substrate located in the bonding area.

For example, in the manufacturing method provided in at least one embodiment of the present disclosure, the providing a touchpad further includes: forming a strengthening layer on the insulating layer located in the bonding area; and the forming a strengthening layer includes: forming a silicide film by silicidation, wherein the strengthening layer has a hardness greater than that of each of the substrate, the wiring layer, the bonding structure and the insulating layer.

BRIEF DESCRIPTION OF THE DRAWINGS

In order to more clearly explain the technical solutions in the embodiments of the present disclosure, the drawings of the embodiments will be briefly introduced below. Obviously, the drawings in the following description are only some embodiments of the present disclosure, and are not intended to limit the present disclosure.

FIG. 1 shows a schematic structural diagram of a display device in the related art.

FIG. 2 shows a schematic diagram of a touch structure of the display device shown in FIG. 1.

FIG. 3 shows a schematic cross-sectional view of a display device provided by at least one embodiment of the present disclosure.

DETAILED DESCRIPTION OF EMBODIMENTS

Figure 4:
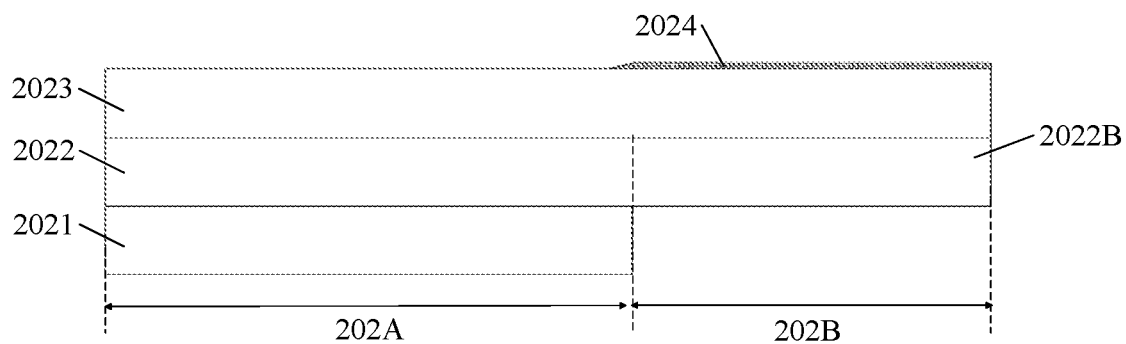
FIG. 4 shows a schematic cross-sectional view of a touchpad in a display device provided by at least one embodiment of the present disclosure.

In order to make the objectives, technical solutions, and advantages of the present disclosure more clear, the technical solutions of the present disclosure are clearly and completely described below with reference to the drawings of the embodiments of the present disclosure. Obviously, the described embodiments are only a part but not all of the embodiments of the present disclosure. Based on the embodiments of the present disclosure, all other embodiments obtained by those ordinary skilled in the art without carrying out creative work fall within the protection scope of the present disclosure.

Unless otherwise defined, technical terms or scientific terms used in the present disclosure shall be of the general meaning understood by those ordinary skilled in the art. The words "first," "second," and the like used in the present disclosure do not denote any order, quantity, or importance, but are used to distinguish different components. The words "comprising," "including" and the like indicate that the element or item preceding the word contains the elements or items listed following the word as well as the equivalents, but do not exclude other elements or items. The words "connected," "coupled," or the like are not limited to physical or mechanical connections, but may include electrical connections, whether direct or indirect. The words "upper", "lower", "left", "right", "top" or "bottom" and the like are only used to indicate relative positional relationship, and when the absolute position of the object described is changed, the relative positional relationship may also correspondingly change.

FIG. 1 shows a touch display device in the related art. As shown in FIG. 1, the touch display device includes a display panel 11 and a touch structure 12 located on a display side (shown as an upper side in the drawing) of the display panel 11. The display panel 11 and the touch structure 12 are combined together, for example, by an adhesive layer 13. The adhesive layer 13 includes, for example, an adhesive such as an optical clear adhesive (OCA).

For example, the touch display device further includes a driving chip (e.g., Integrated Circuit, IC) 20 located on a non-display side (shown as a lower side) of the display panel 11, and a main flexible circuit board (e.g., Main Flexible Printed Circuit, MFPC) 15 electrically connected to the driving chip 20. The main flexible circuit board 15 is used to transmit electrical signals, and the driving chip 20 is used to process electrical signals and provide display control signals, display signals, and the like.

For example, the touch display device further includes a chip on film (COF) 19 that electrically connects the display panel 11 and the driving chip 20. A first end of the chip on film 19 is bonded to the display panel 11 on the display side of the display panel 11, and a second end of the chip on film 19 is arranged on the non-display side of the display panel 11 by bending. The driving chip 20 is arranged on a portion of the chip on film 19 located on the non-display side. The main flexible circuit board 15 is bonded to the second end of the chip on film 19. As a result, the flexible circuit board 15 is electrically connected to the driving chip 20, and the display panel 11 is connected to the flexible circuit board 15 and the driving chip 20 through the chip on film 19.

For example, the touch display device further includes a touch flexible circuit board (e.g., Touch Flexible Printed Circuit, TFPC) 14 that electrically connects the touch structure 12 and the driving chip 20. As shown in FIG. 1, the touch structure 12 has a bonding structure on a side away from the display panel 11 (that is, a touch side, shown as an upper side in the drawing). A first end of the touch flexible circuit board 14 is bonded to the bonding structure. A second end of the touch flexible circuit board 14 is arranged on the non-display side of the display panel 11 by bending, and is bonded to the main flexible circuit board 15. Thus, the touch structure 12 may be electrically connected to the main flexible circuit board 15 and the driving chip 20 through the touch flexible circuit board 14.

For example, FIG. 2 shows a schematic structural diagram of the touch structure 12. As shown in FIG. 2, the touch structure 12 includes a wiring layer 122 on a substrate 121. The wiring layer 122 includes a plurality of touch wirings (not shown) with bonding ends (shown as right ends in the drawing) 122A configured as a bonding structure, such as a gold finger (e.g., bonding pad). For example, an insulating layer 123 and a protective layer 124 are further provided on the wiring layer 122. Portions of the insulating layer 123 and the protective layer 124 that cover the bonding structure are removed, so that the bonding structure is exposed for bonding. For example, the bonding structure is bonded to the first end of the above-mentioned touch flexible circuit board 14 so as to achieve an electrical connection between the touch structure 12 and the touch flexible circuit board 14.

For example, the touch display device further includes structures such as a polarizer 16 and a transparent cover 17 on the touch structure 12. The polarizer 16 and the transparent cover 17 are combined together, for example, by a second adhesive layer 18. The second adhesive layer 18 includes, for example, an adhesive such as an optical clear adhesive, and the transparent cover 17 is, for example, glass.

In the above-mentioned touch display device, a bent portion of the chip on film 19 forms a non-display area with a width of D1 on a periphery of the touch display device, and a bent portion of the touch flexible circuit board 14 forms a non-display area with a width of D2 on the periphery of the touch display device. Images cannot be displayed in these areas, so that a border frame of the touch display device is formed, which reduces a display screen ratio of the touch display device and is not conducive to a development trend of large-screen touch display devices.

At least one embodiment of the present disclosure provides a display device and a manufacturing method thereof. The display device includes a display panel, a touchpad, and a joint. The touchpad is located on the display side of the display panel and includes a main body area and a bonding area. The joint is arranged on a side of the display panel facing the touchpad and is configured to electrically connect the touchpad and the driving chip. A side of the bonding area facing the display panel is configured to be joined with the joint. The display device may have a higher display screen ratio.

The display device and the manufacturing method thereof of the present disclosure will be described below through several specific embodiments.

Figure 5:
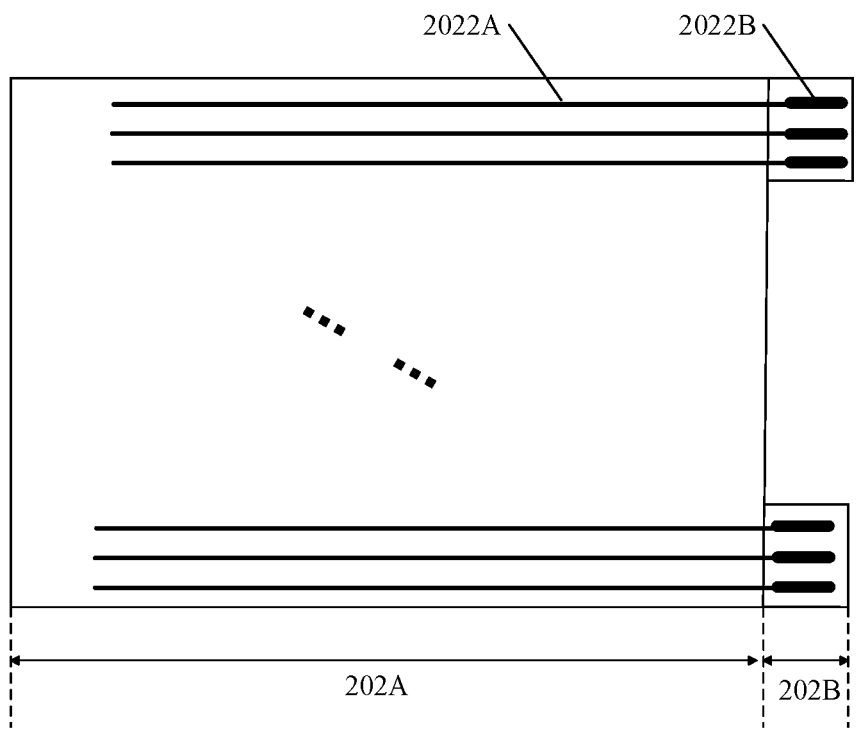
FIG. 5 shows a schematic plan view of a wiring layer of a touchpad in a display device provided by at least one embodiment of the present disclosure.

At least one embodiment of the present disclosure provides a display device. FIG. 3 shows a schematic cross-sectional view of the display device. FIG. 4 shows a schematic cross-sectional view of a touchpad in the display device. FIG. 5 shows a schematic plan view of a wiring layer of a touchpad in the display device.

As shown in FIG. 3, the display device includes a display panel 201, a touchpad 202 and a joint 2011. The touchpad 202 is located on a display side (shown as an upper side in the drawing) of the display panel 201, and includes a main body area 202A and a bonding area 202B. The main body area 202A includes a touch area for touch operation and a peripheral area. The bonding area 202B is used to bond and connect the touchpad 202 to other circuit structures, such as circuit boards, driving chips, and so on. The joint 2011 is arranged on the side of the display panel 201 facing the touchpad 202 and is configured to electrically connect the touchpad 202 and the driving chip 210. The side of the bonding area 202B facing the display panel 201 is configured to be joined with the joint 2011. The side of the main body area 202A facing the display panel 201 is combined with the display panel 201, for example, by an adhesive layer 203 (such as an optical clear adhesive), thereby fixing the touchpad 202 to the display panel 201.

For example, the driving chip 210 is configured to achieve a touch function. The driving chip 210 may be integrated with a display driving chip, or may be provided separately from the display driving chip, which is not limited in the embodiment of the present disclosure.

For example, the display panel 201 includes a touchpad bonding area 201A, and the joint 2011 is arranged in the touchpad bonding area 201A. The touchpad 202 includes a bonding structure located in the bonding area 202B. The joint 2011 corresponds to and is electrically connected to the bonding structure, so as to facilitate the bonding connection between the joint 2011 and the bonding structure.

For example, FIG. 4 shows a schematic cross-sectional view of the touchpad in the display device, and FIG. 5 shows a schematic plan view of a wiring layer of the touchpad in the display device. As shown in FIGS. 4 and 5, the main body area 202A of the touchpad 202 includes a substrate 2021, a wiring layer 2022 and an insulating layer 2023 that are sequentially stacked from the display panel 201 side. The wiring layer 2022 includes a plurality of touch wirings 2022A. The bonding area 202B includes a bonding structure 2022B and an insulating layer 2023 that are sequentially stacked from the display panel 201 side. The bonding structure 2022B and the wiring layer 2022 are arranged in the same layer. That is to say, in the manufacturing process, the bonding structure 2022B and the wiring layer 2022 may be formed using the same film layer. For example, in the manufacturing process, the bonding structure 2022B and the wiring layer 2022 may be formed by a patterning process using the same film layer and the same mask.

For example, as shown in FIG. 5, the bonding structure 2022B located in the bonding area 202B is a first gold finger provided at an end portion of each touch wiring 2022A. For example, the joint 2011 includes second gold fingers respectively corresponding to a plurality of first gold fingers. In the process of bonding the bonding area 202B and the joint 2011, the first gold fingers and the second gold fingers are electrically connected in a one-to-one correspondence, so as to achieve the bonding of the bonding area 202B and the joint 2011.

For example, the bonding area 202B and the joint 2011 may be directly bonded together by welding, or the bonding area 202B and the joint 2011 may also be bonded together by a conductive adhesive. For example, the conductive adhesive includes an adhesive body and conductive particles distributed in the adhesive body. After the conductive adhesive is cured, the conductive particles in the conductive adhesive form a conductive path, thereby bonding the bonding structure 2022B and the joint 2011. For example, in some embodiments, the bonding area 202B and the joint 2011 may also be bonded by vibration or friction. For example, an ultrasonic generator is used to generate ultrasonic waves, which form a high-frequency vibration after passing through a transducer, and the high-frequency vibration is applied to the bonding structure 2022B and the joint 2011 through capillary. Under the action of pressure and vibration, surfaces of the bonding structure 2022B and the joint 2011 rub against each other and undergo plastic deformation, so that the bonding structure 2022B and the joint 2011 are in close contact to achieve a bonding of atomic distances, and finally a strong bonding connection is formed. For example, the bonding area 202B and the joint 2011 may also be bonded in other ways, which are not specifically limited in the embodiments of the present disclosure.

For example, in some embodiments, as shown in FIG. 4, the bonding area 202B may further include a strengthening layer 2024 arranged on a side of the insulating layer 2023 away from the bonding structure 2022B. The strengthening layer 2024 has a hardness greater than that of each of the substrate 2021, the wiring layer 2022, the bonding structure 2022B, and the insulating layer 2023. Therefore, the strengthening layer 2024 may prevent the bonding area 202B of the touchpad 202 from warping and other undesirable phenomena.

For example, in some embodiments, a Mohs hardness of the strengthening layer 2024 is greater than or equal to 5, such as 6, 7, etc. A thickness of the strengthening layer 2024 is about 1 μm-5 μm, such as 2 μm or 3 μm. Therefore, the strengthening layer 2024 may provide sufficient strength, so as to effectively prevent the bonding area 202B of the touchpad 202 from warping and other undesirable phenomena.

For example, in some embodiments, the strengthening layer 2024 is a silicide film formed by siliconization, and the silicide film includes silicon dioxide. For example, a process of the siliconization is to hydrolyze glass into a colorless and transparent colloidal substance, then a catalyst (such as an acidic substance) is added to the colloidal substance, and after mixing, a mixture of the colloidal substance and the catalyst is applied, for example, on the insulating layer 2023 located in the bonding area 202B. After curing, the mixture may form a dense silicide film on the insulating layer 2023. For example, a Mohs hardness of the silicide film may reach 6 or more, such as 7, so it has sufficient strength to effectively prevent the bonding area 202B of the touchpad 202 from warping and other undesirable phenomena.

Figure 6:
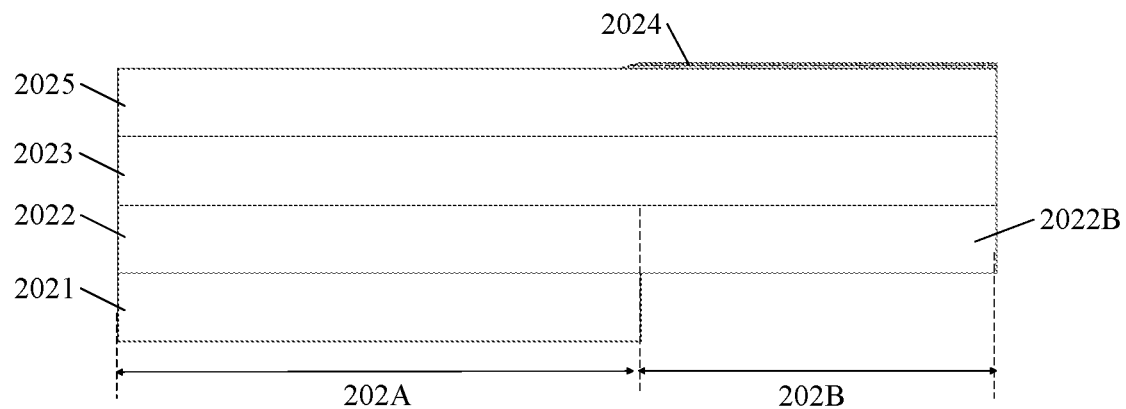
FIG. 6 shows a schematic cross-sectional view of a touchpad in another display device provided by at least one embodiment of the present disclosure.

For example, in some embodiments, as shown in FIG. 6, the touchpad 202 may further include a protective layer 2025 on the insulating layer 2023, so as to provide further protection for the touchpad 202. For example, the protective layer 2025 is formed in the main body area 202A and the bonding area 202B, so as to provide protection for the functional structures in the two areas. In this case, the strengthening layer 2024 may be arranged on a side of a portion of the protective layer 2025 located in the bonding area 202B away from the bonding structure 2022B, so as to prevent the bonding area 202B of the touchpad 202 from warping and other undesirable phenomena.

For example, in some embodiments, the substrate 2021 of the touchpad 202 may contain a resin material such as polyimide. The wiring layer 2022 and the bonding structure 2022B may include metal materials such as copper, silver and aluminum, or alloy materials. The insulating layer 2023 includes an inorganic material such as silicon dioxide, silicon nitride and silicon oxynitride, or a resin material such as polyimide and epoxy resin. The protective layer 2025 may include a resin material such as polyimide and epoxy resin. For example, in some embodiments, when the insulating layer 2023 is sufficient to provide the protection, the protective layer 2025 may not be provided, as shown in FIG. 5.

For example, in some embodiments, as shown in FIG. 3, the joint 2011 is arranged on the side of the display panel 201 facing the touchpad 202. The joint 2011 and the bonding structure 2022B are directly opposite and electrically connected to each other. That is to say, the joint 2011 and the bonding stricture 2022B may be directly bonded together without a participation of other connecting components (such as circuit boards), which reduces space occupation of other connecting components arranged therein.

For example, in some embodiments, the display device further includes a chip on film 204, which may be used to electrically connect the joint 2011 and the driving chip 210, so as to achieve the electrical connection between the touchpad 202 and the driving chip 210. For example, a first end 204A of the chip on film 204 is bonded to the joint 2011 located in the touchpad bonding area 201A, a second end 204B of the chip on film 204 is arranged on the non-display side of the display panel 201 by bending, and the driving chip 210 is arranged on a portion of the chip on film 204 located on the non-display side. Thus, the touchpad 202 may be electrically connected to the driving chip 210 through the bonding area 202B, the joint 2011 and the chip on film 204. For example, the joint 2011 includes a first joint portion bonded to the bonding structure of the touchpad 202 and a second joint portion bonded to the first end 204A of the chip on film 204, and the first joint portion and the second joint portion are electrically connected to achieve the joining. For example, the chip on film 204 is provided with a corresponding cable, through which the touchpad 202 is electrically connected to the driving chip 210.

For example, the display device further includes a flexible circuit board 211, such as a main flexible circuit board, which is bonded to the second end 204B of the chip on film 204. Therefore, the touchpad 202 may be electrically connected to the flexible circuit board 211 through the chip on film 204.

Figure 7:
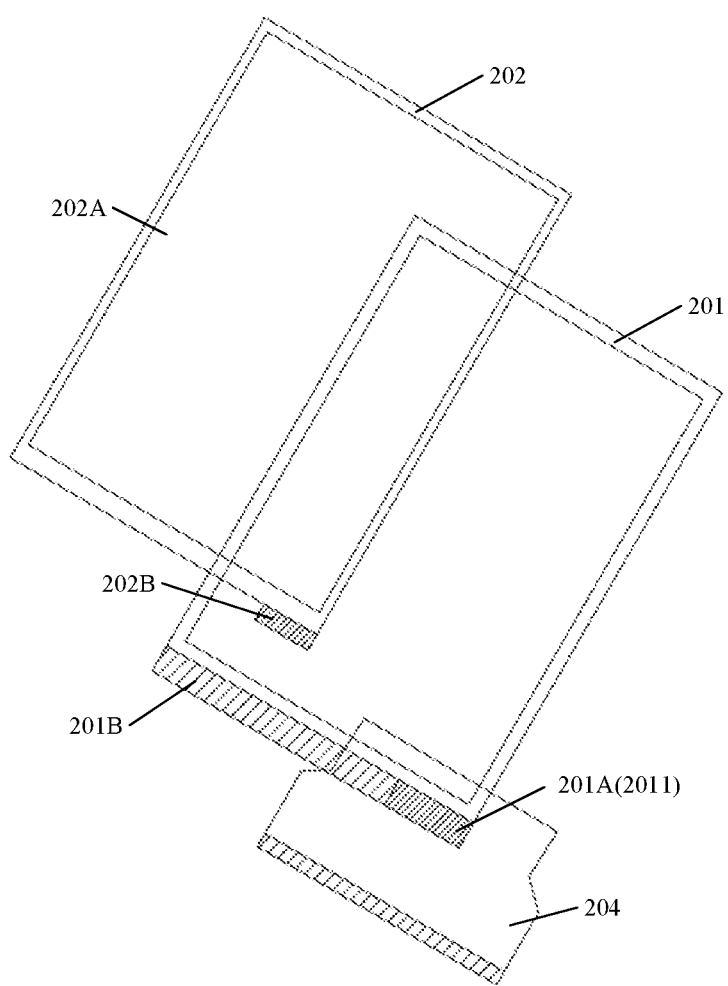
FIG. 7 shows an exploded view of a partial structure of a display device provided by at least one embodiment of the present disclosure.
Figure 8:
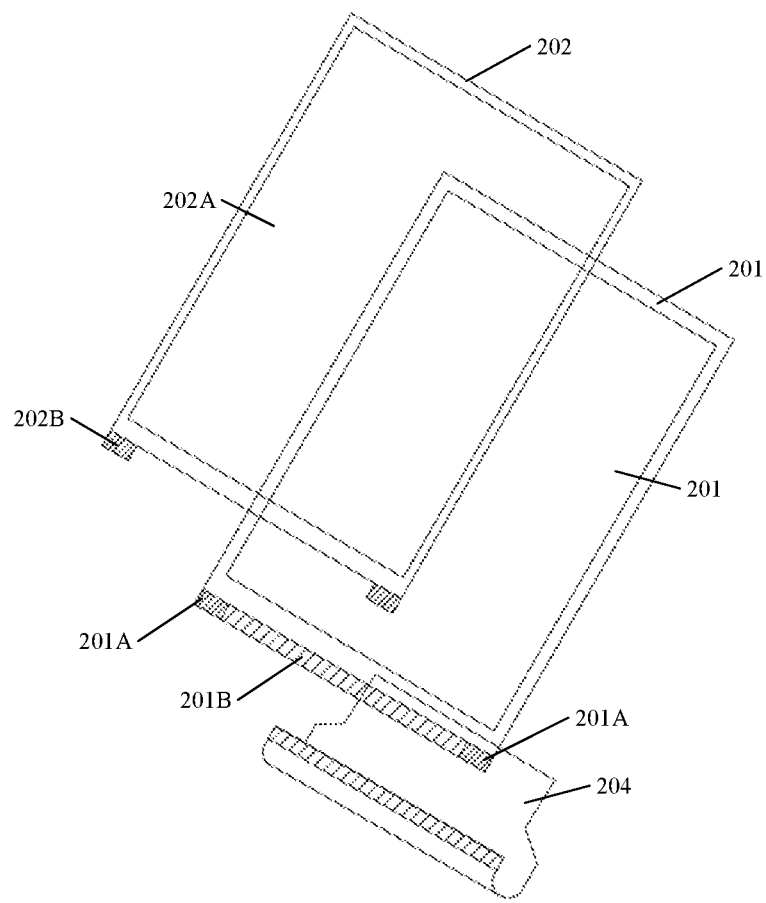
FIG. 8 shows another exploded view of a partial structure of a display device provided by at least one embodiment of the present disclosure.

For example, FIGS. 7 and 8 show two exploded views of a partial structure of a display device provided by the embodiments of the present disclosure. For example, as shown in FIG. 7, the display panel 201 may further include a display bonding area 201B. The touchpad bonding area 201A and the display bonding area 201B are located on the same side (shown as the lower side) of the display panel 201 and insulated from each other. The first end 204A of the chip on film 204 is further bonded to the display bonding area 201B. In this way, the chip on film 204 may transmit both display signals of the display panel 201 and touch signals of the touchpad 202.

For example, in some embodiments, as shown in FIG. 7, the touchpad bonding area 201A and the display bonding area 201B are arranged side by side on the same side of the display panel 201. A length of the first end of the chip on film 204 (that is, a size of the first end of the chip on film 204 along an arrangement direction of the touchpad bonding area 201A and the display bonding area 201B) is substantially equal to a sum of lengths of the touchpad bonding area 201A and the display bonding area 201B, so that the first end of the chip on film 204 may be respectively bonded to the touchpad bonding area 201A and the display bonding area 201B. For example, FIG. 7 shows a situation where the chip on film 204 has not been bent. After the chip on film 204 is bent, the first end (that is, the lower end shown) of the chip on film 204 is respectively bonded to the touchpad bonding area 201A and the display bonding area 201B on the display side of the display panel, and the second end (that is, the end opposite to the first end) is arranged on the non-display side of the display panel by bending.

For example, in some other embodiments, as shown in FIG. 8, the display panel may include two touchpad bonding areas 201A respectively arranged on both sides of the display bonding area 201B. In this case, the bonding area 202B of the touchpad includes two portions corresponding to the two touchpad bonding areas 201A. For example, the length of the first end of the chip on film 204 (that is, the size of the first end of the chip on film 204 along the arrangement direction of the touchpad bonding area 201A and the display bonding area 201B) is substantially equal to the sum of the lengths of both touchpad bonding areas 201A and the display bonding area 201B, so that the first end of the chip on film 204 may be bonded respectively to both touchpad bonding areas 201A and the display bonding area 201B. For example, FIG. 8 shows a state where the chip on film 204 has been bent.

In the above-mentioned embodiment, the touchpad bonding area 201A and the display bonding area 201B are arranged on the same side of the display panel 201 and arranged side by side, so that the display panel 201 and the touchpad 202 are both electrically connected to the driving chip 20 by using one chip on film on one side of the display panel 201, thereby simplifying the structure of the display device.

For example, in some embodiments, the display device may further include structures such as a polarizer 206 and a transparent cover 207 located on the touchpad 202, and the specific structure of the display device is not limited in the embodiments of the present disclosure. For example, the polarizer 206 and the transparent cover 207 are bonded together by a second adhesive layer 205. The second adhesive layer 205 includes, for example, an adhesive such as an optical clear adhesive, and the transparent cover 207 is a glass cover, for example.

In the above-mentioned display device, the touchpad 202 is bonded to the joint 2011 located on the display panel 201 through the bonding structure facing the display panel 201, and is then electrically connected to the driving chip 20 through the joint 2011 and the chip on film 204. Then, the chip on film 214 may be bonded to both the display panel 201 and the touchpad 202. Compared with the display device shown in FIG. 1, the touch flexible circuit board dedicated to the bonding of the touch structure may be reduced, and then the non-display area with the width of D2 formed on the periphery of the display device by the touch flexible circuit board is reduced, thereby increasing the display screen ratio of the display device.

For example, in other embodiments of the present disclosure, the touchpad 202 may also be electrically connected to the driving chip 20 in other ways, which may also achieve the technical effect of increasing the display screen ratio of the display device.

Figure 9:
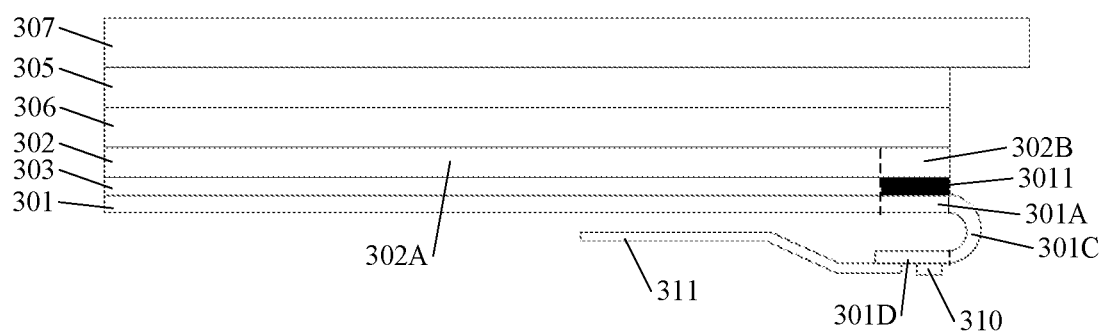
FIG. 9 shows a schematic cross-sectional view of another display device provided by at least one embodiment of the present disclosure.

For example, at least one embodiment of the present disclosure further provides a display device. FIG. 9 shows a schematic cross-sectional view of the display device. Different from the above-mentioned embodiment, the display device does not include a chip on film, and the display panel and the touchpad are electrically connected to the driving chip through the bending of the display panel.

For example, as shown in FIG. 9, the display device includes a display panel 301, a touchpad 302 and a joint 3011. The touchpad 302 is located on the display side (shown as the upper side) of the display panel 301, and includes a main body area 302A and a bonding area 302B. The joint 3011 is arranged on the side of the display panel 301 facing the touchpad 302 and is configured to electrically connect the touchpad 302 and the driving chip 310. The side of the bonding area 302B facing the display panel 301 is configured to be joined with the joint 3011. The side of the main body area 302A facing the display panel 301 is combined with the display panel 301, for example, through an adhesive layer 303.

For example, the display panel 301 includes a touchpad bonding area 301 A, and the joint 3011 is arranged in the touchpad bonding area 301A. The touchpad 302 includes a bonding structure located in the bonding area 302B, and the joint 3011 is electrically connected to the bonding structure. The specific forms of the bonding structure and the joint 3011 may refer to the above-mentioned embodiment, which will not be repeated here. For example, the display panel 301 may further include a display bonding area. The setting forms of the touchpad bonding area 301A and the display bonding area may refer to the above-mentioned embodiment, which will not be repeated here.

For example, the joint 3011 is arranged on the side of the display panel 301 facing the touchpad 302, that is, the display side of the display panel 301. The joint 3011 and the bonding structure of the bonding area 302B are directly opposite and electrically connected to each other, that is, the two may be directly bonded together without the participation of other connecting components (such as circuit boards), thereby reducing space occupation of other connecting components arranged therein.

For example, as shown in FIG. 9, the display panel 301 further includes a bending area 301C and a non-display side portion 301D. The non-display side portion 301D is arranged on the non-display side of the display panel 301 by bending of the bending area 301C, so that the non-display side portion 301D includes the portion of the display panel 301 that is bent to the non-display side. The driving chip 310 is arranged on the display bonding portion 310D. In this way, the touchpad 302 is electrically connected to the driving chip 310 through the touchpad bonding area 301A and the bending area 301C of the display panel 301.

For example, in some embodiments, the display device may further include structures such as a flexible circuit board 311, and a polarizer 306 and a transparent cover 307 on the touchpad 302. The specific structure of the display device is not limited in the embodiments of the present disclosure. For example, the flexible circuit board 311 is bonded to an end portion of the display bonding portion 310D, and the polarizer 306 and the transparent cover 307 are combined together by a second adhesive layer 305. The second adhesive layer 305 includes, for example, an adhesive such as an optical clear adhesive, and the transparent cover 307 is a glass cover, for example.

In the above-mentioned display device, the touchpad 302 is bonded to the joint 3011 located on the display panel 301 through the bonding structure facing the display panel 301, and is then electrically connected to the driving chip 30 through the joint 3011 and the bending area 301C of the display panel 301. Then, both the display panel 301 and the touchpad 302 may be electrically connected to the driving chip 30 through the display panel. Compared with the display device shown in FIG. 1, the touch flexible circuit board dedicated to the bonding of the touch structure may be reduced, and then the non-display area with the width of D2 formed on the periphery of the display device by the touch flexible circuit board is reduced, thereby increasing the display screen ratio of the display device.

At least one embodiment of the present disclosure further provides a manufacturing method of a display device, including: providing a display panel; providing a touchpad including a main body area and a bonding area; providing a joint on a side of the display panel facing the touchpad, wherein the joint is configured to electrically connect the touchpad and a driving chip; joining a side of the bonding area facing the display panel to the joint, so as to join the touchpad to a display side of the display panel.

In the following description of the manufacturing method of the display device provided by the embodiment of the present disclosure, the display device shown in FIG. 3 is illustrated by way of example, but this does not constitute a limitation of the present disclosure.

For example, the display panel 201 is provided first. The display panel 201 provided may be an organic light emitting display (OLED) panel, a liquid crystal display (LCD) panel, or a quantum dot light emitting display (QLED) panel, etc. The specific type of the display panel 201 is not limited in the embodiment of the present disclosure.

For example, the display panel 201 includes a touchpad bonding area 201A. The providing a joint includes forming the joint 2011 in the touchpad bonding area 201A. For example, in some embodiments, the joint 2011 may be directly formed in the touchpad bonding area 201A, for example, formed on the display panel 201, in the same layer as other bonding structures on the display panel (such as the bonding structure located in the display bonding area). Alternatively, in some embodiments, the joint 2011 may be attached to the touchpad bonding area 201A after being prepared, and the embodiment of the present disclosure does not limit the formation mode of the joint 2011.

For example, in some embodiments, the manufacturing method further includes: providing the chip on film 204, bonding the first end 204A of the chip on film 204 to the joint 2011 of the touchpad bonding area 201A, and forming the second end 204B of the chip on film 204 on the non-display side of the display panel 201 by bending, wherein the driving chip 210 is arranged on the portion of the chip on film 204 located on the non-display side.

For example, in some embodiments, the manufacturing method further includes:

providing a flexible circuit board 211, and bonding the flexible circuit board 211 to the second end 204B of the chip on film 204.

For example, in some embodiments, the providing a touchpad includes preparing the touchpad, and then combining the prepared touchpad with the display panel 201.

Figure 10A:
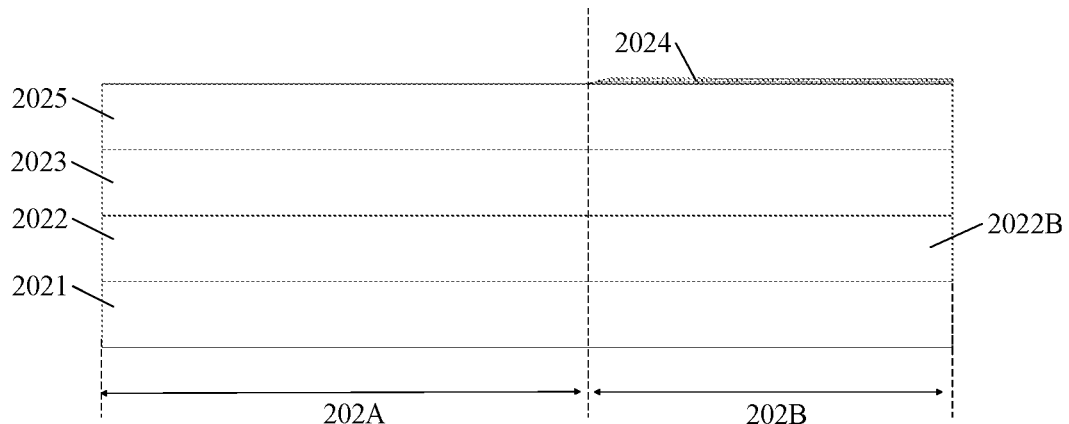
FIGS. 10A-10B show schematic diagrams of a touchpad provided by at least one embodiment of the present disclosure during a manufacturing process.
Figure 10B:
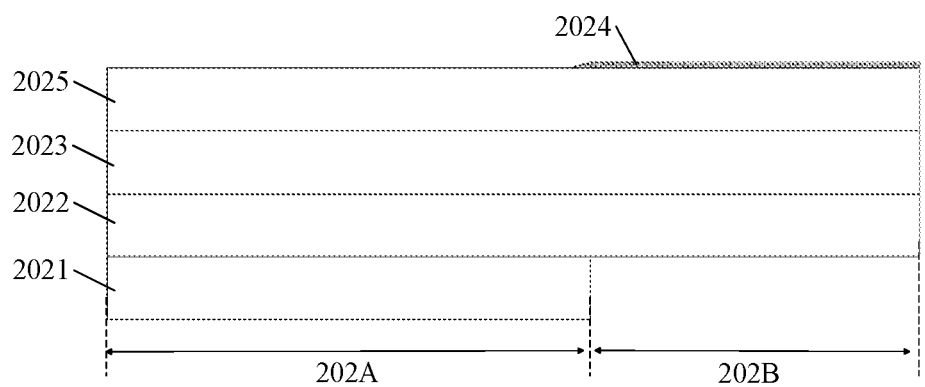

For example, as shown in FIGS. 10A to 10B, the forming the touchpad includes: forming, on the substrate 2021, a wiring layer 2022 located in the main body area 202A and a bonding structure 2022B located in the bonding area 202B, and forming an insulating layer 2023 on the wiring layer 202 and the bonding structure 2022B. In some embodiments, after the insulating layer 2023 is formed, a protective layer 2025 may be formed on the insulating layer 2023, and then a strengthening layer 2024 is formed on the portion of the protective layer 2025 located in the bonding area 202B. Finally, the portion of the substrate 2021 located in the bonding area 202B is removed to expose the bonding structure 2022B so as to achieve the bonding. For example, in some embodiments, when the insulating layer 2023 is sufficient to provide protection, the protective layer 2025 may not be formed, but a strengthening layer 2024 is formed on the portion of the insulating layer 2023 located in the bonding area 202B.

For example, the substrate 2021 may contain a resin material such as polyimide. The wiring layer 2022 and the bonding structure 2022B may contain metal materials such as copper, silver and aluminum, or alloy materials. For example, the wiring layer 2022 located in the main body area 202A and the bonding structure 2022B located in the bonding area 202B may be simultaneously formed on the substrate 2021 through a patterning process by using the same film layer and the same mask. The insulating layer 2023 includes an inorganic material such as silicon dioxide, silicon nitride and silicon oxynitride, or a resin material such as polyimide and epoxy resin. For example, the insulating layer 2023 may be formed on the wiring layer 2022 and the bonding structure 2022B by coating or deposition. The protective layer 2025 may contain a resin material such as polyimide and epoxy resin. For example, the protective layer 2025 may be formed on the insulating layer 2023 by coating or deposition. For example, the forming the strengthening layer 2025 on the portion of the insulating layer 2023 or the protective layer 2025 located in the bonding area 202B includes forming a silicide film by silicidation, wherein the strengthening layer 2025 formed has a hardness greater than that of each of the substrate 2021, the wiring layer 2022, the bonding structure 2022B and the insulating layer 2023.

For example, the forming a silicide film through silicidation includes: hydrolyzing glass into a colorless and transparent colloidal substance, then adding a catalyst (such as an acidic substance) to the colloidal substance, and after mixing, applying the mixture of the colloidal substance and the catalyst, for example, on the insulating layer 2023 (or the protective layer 2025) located in the bonding area 202B. After curing, the mixture may form a dense silicide film on the insulating layer 2023 (or the protective layer 2025). For example, the hardness of the silicide film formed is greater than 5, such as 6, 7, etc., and the thickness of the silicide film is about 1 µm-5 µm, such as 2 µm or 3 µm.

For example, after the above structure is formed, as shown in FIG. 10B, the portion of the substrate 2021 located in the bonding area 202B is removed to expose the bonding structure. For example, in some embodiments, a laser lift-off method may be used to remove the portion of the substrate 2021 located in the bonding area 202B, that is, a laser beam is used to irradiate the portion of the substrate 2021 that needs to be removed, so that the portion is peeled off the touchpad.

Figure 11:
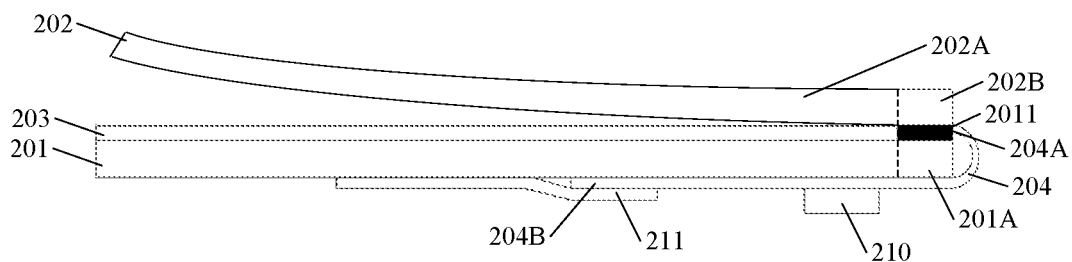
FIG. 11 shows a schematic diagram of a display device provided by at least one embodiment of the present disclosure during a manufacturing process.

For example, after the touchpad is prepared in the above manner, the touchpad 202 is combined with the display panel 201. As shown in FIG. 11, the process includes: joining the side of the bonding area 202B facing the display panel 201 with the joint 2011, and then combining the main body area 202A with the display panel 201.

For example, the process of joining the bonding area 202B and the joint 2011 includes: electrically connecting the joint 2011 to the bonding structure 2022B, and then joining (for example, welding) and electrically connecting the bonding structure 2022B and the joint 201, for example, by hot pressing. For example, in some examples, in the process of joining by hot pressing, the surface of the joint 2011 and/or the bonding structure 2022B may be coated with conductive adhesive, so that the bonding of the joint 2011 and the bonding structure 2022B is more firm. For example, the bonding area 202B includes a plurality of first gold fingers, and the joint 2011 includes a plurality of second gold fingers. During the joining process, the surfaces of the first gold fingers and/or the second gold fingers may be coated with conductive adhesive, and the first gold fingers and the second gold fingers are hot pressed in a one-to-one correspondence, so as to join the bonding area 202B and the joint 2011.

For example, after the bonding structure of the touchpad 202 is joined to the joint 2011, the main body area 202A may be combined with the display panel 201 by using the adhesive layer 203. For example, the adhesive layer 203 includes an adhesive such as an optical clear adhesive to adhere the main body area 202A to the display panel 201. For example, the adhesive layer 203 may be applied on the display substrate in advance (the case shown in FIG. 11), or the adhesive layer 203 may also be applied on the substrate 2021 of the touchpad 202, which is not limited in the embodiment of the present application as long as the main body area 202A may be combined with the display panel 201.

For example, after the display panel 201 is combined with the touchpad 202, structures such as the polarizer 206 and the transparent cover 207 may be formed on the touchpad 202. Other structures of the display device and formation modes thereof are not limited in the embodiments of the present disclosure.

For example, the manufacturing method provided by the embodiment of the present disclosure may also be used to manufacture the display device as shown in FIG. 9. The difference from the above embodiment is that the display panel 301 provided in this embodiment includes a bending area 301C and a non-display side portion 301D. Therefore, the manufacturing process further includes steps of bending the bending area 301C to form the non-display side portion 301D on the non-display side of the display panel 301. In this case, the driving chip 310 is arranged on the non-display side portion 301D, and the touchpad 302 is electrically connected to the driving chip 310 through the touchpad bonding area 301A and the bending area 301C.

The preparation method of the touchpad 302 of the display device and the combination with the display panel 301 may refer to the above-mentioned embodiments, which will not be repeated here.

In the display device formed by the manufacturing method provided by the embodiment of the present disclosure, the touchpad is joined to the joint located on the display panel through the bonding structure facing the display panel, and is then electrically connected to the driving chip through the joint. Then, the display panel and the touchpad may be electrically connected to the driving chip 30 through the same connecting structure (such as the chip on film or the display panel itself). Compared with the display device shown in FIG. 1, the touch flexible circuit board dedicated to the bonding of the touch structure may be reduced, and then the non-display area with the width of D2 formed on the periphery of the display device by the touch flexible circuit board is reduced, thereby increasing the display screen ratio of the display device.

The following points are also explained.
(1) The drawings of the embodiments of the present disclosure only refer to the structures involved in the embodiments of the present disclosure, and other structures may refer to the usual design.
(2) For the sake of clarity, in the drawings used to describe the embodiments of the present disclosure, the thickness of layers or areas are enlarged or reduced, that is, these drawings are not drawn according to actual scale. It should be understood that when an element such as a layer, film, area or substrate is referred to as being "on" or "under" another element, this element may be directly "on" or "under" the other element or there may be an intermediate element.
(3) In the case of no conflict, the embodiments of the present disclosure and the features in the embodiments may be combined with each other to obtain new embodiments.

The above are only specific implementations of the present disclosure, but the protection scope of the present disclosure is not limited thereto. Any changes or substitutions within the technical scope disclosed in the present disclosure that may be readily envisaged by those skilled in the art may be covered within the protection scope of the present disclosure. Therefore, the protection scope of the present disclosure should be subject to the protection scope of the claims.

What is claimed is:

1. A display device, comprising:
a display panel;
a touchpad located on a display side of the display panel and comprising a main body area and a bonding area; and
a joint arranged on a side of the display panel facing the touchpad and configured to electrically connect the touchpad and a driving chip,
wherein a side of the bonding area facing the display panel is configured to be joined with the joint;
wherein the display panel comprises a touchpad bonding area, and the joint is arranged in the touchpad bonding area;
wherein the touchpad comprises a bonding structure located in the bonding area, and the joint is electrically connected to the bonding structure;
wherein the main body area comprises a substrate, a wiring layer and an insulating layer sequentially stacked from a display panel side;
wherein the bonding area comprises a bonding structure and the insulating layer sequentially stacked from the display panel side; and
wherein the bonding structure and the wiring layer are arranged in the same layer.

2. The display device according to claim 1, wherein the joint is arranged on the side of the display panel facing the touchpad, and the joint is directly opposite to and electrically connected to the bonding structure.

3. The display device according to claim 1, further comprising a chip on film having wherein a first end of the chip on film is bonded to the joint of the touchpad bonding area and a second end of the chip on film is arranged on a non-display side of the display panel, and the driving chip is arranged on a portion of the chip on film that is located on the non-display side.

4. The display device according to claim 3, wherein the display panel further comprises a display bonding area, the touchpad bonding area and the display bonding area are located on the same side of the display panel and are insulated from each other, and the first end of the chip on film is further bonded to the display bonding area.

5. The display device according to claim 4, wherein the display panel comprises two touchpad bonding areas respectively arranged on both sides of the display bonding area; and wherein the touchpad bonding area and the display bonding area are arranged side by side on the same side.

6. The display device according to claim 1, wherein the display panel comprises a bending area and a non-display side portion, and the touchpad bonding area is arranged on the side of the display panel facing the touchpad; and wherein the non-display side portion comprises a portion of the display panel that is bent to the non-display side of the display panel, the driving chip is arranged on the non-display side portion, and the touchpad is electrically connected to the driving chip through the touchpad bonding area and the bending area.

7. The display device according to claim 1, wherein the bonding area further comprises a strengthening layer arranged on a side of the insulating layer away from the bonding structure; and wherein the strengthening layer has a hardness greater than that of each of the substrate, the wiring layer, the bonding structure and the insulating layer.

8. The display device according to claim 7, wherein the strengthening layer has a Mohs hardness greater than or equal to 5, and a thickness of about 1 μm-5 μm.

9. The display device according to claim 7, wherein the strengthening layer is a silicide film formed by silicidation, and the silicide film comprises silicon dioxide.

10. A manufacturing method of a display device, comprising:

providing a display panel;

providing a touchpad comprising a main body area and a bonding area;

providing a joint on a side of the display panel facing the touchpad, wherein the joint is configured to electrically connect the touchpad and a driving chip; and joining a side of the bonding area facing the display panel to the joint, so as to join the touchpad to a display side of the display panel, wherein the display panel comprises a touchpad bonding area, the joint is formed in the touchpad bonding area, and the touchpad comprises a bonding structure located in the bonding area;

wherein the joining a side of the bonding area facing the display panel to the joint comprises: joining and electrically connecting the bonding structure to the joint and wherein the providing a touchpad comprises:

forming, on a substrate, a wiring layer located in the main body area and a bonding structure located in the bonding area;

forming an insulating layer on the wiring layer and the bonding structure; and removing a portion of the substrate located in the bonding area, so as to expose the bonding structure.

11. The manufacturing method according to claim 10, further comprising:

providing a chip on film, bonding a first end of the chip on film to the joint located in the touchpad bonding area, and forming a second end of the chip on film on a non-display side of the display panel by bending, wherein the driving chip is arranged on a portion of the chip on film that is located on the non-display side.

12. The manufacturing method according to claim 10, wherein the display panel comprises a bending area and a non-display side portion, the manufacturing method further comprising:

bending the bending area so as to form the non-display side portion on the non-display side of the display panel, wherein the driving chip is arranged on the non-display side portion, and the touchpad is electrically connected to the driving chip through the touchpad bonding area and the bending area.

13. The manufacturing method according to claim 10, wherein subsequent to joining the side of the bonding area facing the display panel to the joint, the manufacturing method further comprises:

combining the main body area with the display panel.

14. The manufacturing method according to claim 10, wherein the removing a portion of the substrate located in the bonding area so as to expose the bonding structure comprises:

removing, by using laser lift off, the portion of the substrate located in the bonding area.

15. The manufacturing method according to claim 10, wherein the providing a touchpad further comprises:

forming a strengthening layer on the insulating layer of the bonding area.

16. The manufacturing method according to claim 15, wherein the forming a strengthening layer comprises:

forming a silicide film by silicidation, wherein the strengthening layer has a hardness greater than that of each of the substrate, the wiring layer, the bonding structure and the insulating layer.

* * * * *